United States Patent
Arthur et al.

(10) Patent No.: US 12,507,088 B2
(45) Date of Patent: Dec. 23, 2025

(54) RESOURCE REALLOCATION IN TELECOMMUNICATIONS NETWORKS USING NETWORK PERFORMANCE MODELS

(71) Applicant: T-Mobile USA, Inc., Bellevue, WA (US)

(72) Inventors: Denzel Daniel Arthur, Stewartsville, NJ (US); Andrew James McNeil, Morristown, NJ (US); Tsung-Ying Lu, Parsippany, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 326 days.

(21) Appl. No.: 18/364,930

(22) Filed: Aug. 3, 2023

(65) Prior Publication Data

US 2025/0048133 A1    Feb. 6, 2025

(51) Int. Cl.
*H04W 28/16*    (2009.01)
*H04W 24/02*    (2009.01)

(52) U.S. Cl.
CPC ........... *H04W 24/02* (2013.01); *H04W 28/16* (2013.01)

(58) Field of Classification Search
CPC .............................. H04W 24/02; H04W 28/16
USPC ........................................................ 370/329
See application file for complete search history.

(56) References Cited

U.S. PATENT DOCUMENTS

| | | | |
|---|---|---|---|
| 8,472,950 B2 | 6/2013 | Bao et al. | |
| 8,498,207 B2 | 7/2013 | Trigui et al. | |
| 8,964,582 B2 | 2/2015 | Wilkinson | |
| 9,596,636 B2 | 3/2017 | Chen et al. | |
| 9,706,411 B2 | 7/2017 | Goswami et al. | |
| 9,706,558 B2 | 7/2017 | Lioulis et al. | |
| 9,730,086 B2 | 8/2017 | Flanagan et al. | |
| 9,736,700 B1 | 8/2017 | Douberley et al. | |
| 9,743,416 B2 | 8/2017 | Sandberg et al. | |
| 9,813,969 B2 | 11/2017 | Axmon et al. | |
| 9,848,337 B2 | 12/2017 | Puthenpura et al. | |
| 9,930,675 B2 | 3/2018 | Wei et al. | |
| 9,986,580 B2 | 5/2018 | Leung et al. | |

(Continued)

FOREIGN PATENT DOCUMENTS

| | | |
|---|---|---|
| CN | 108924845 A | 11/2018 |
| CN | 108990119 A | 12/2018 |

(Continued)

*Primary Examiner* — Ayman A Abaza
(74) *Attorney, Agent, or Firm* — Perkins Coie LLP

(57) ABSTRACT

The technology includes a system to reallocate user experience resources. The system detects network performance in a set of cell areas. The system determines low-performing cell areas and high-performing cell areas by using a network performance model. The system determines common subscribers between the low-performing cell areas and the high-performing cell areas. Based on the common subscribers, the system identifies a recipient cell area and a donor cell area. The system determines a reallocation of user experience resources by using the network performance model to determine scores based on changes to cell site parameters of the donor cell area and the recipient cell area. The system generates an indication that the reallocation will improve user experiences for subscribers of the recipient cell area, without diminishing user experiences for subscribers of the donor cell area.

20 Claims, 7 Drawing Sheets

(56) References Cited

U.S. PATENT DOCUMENTS

| | | |
|---|---|---|
| 10,159,111 B2 | 12/2018 | De Pasquale et al. |
| 10,251,102 B2 | 4/2019 | Levinkron et al. |
| 10,334,490 B2 | 6/2019 | Zingler |
| 10,470,078 B2 | 11/2019 | Murphy et al. |
| 10,477,426 B1 | 11/2019 | Tiwari et al. |
| 10,555,191 B1 | 2/2020 | Jat et al. |
| 10,609,587 B2 | 3/2020 | Livschitz et al. |
| 10,628,769 B2 | 4/2020 | Gajdzinski et al. |
| 10,779,183 B2 | 9/2020 | Li et al. |
| 10,785,123 B2 | 9/2020 | Gonguet |
| 10,880,754 B1 | 12/2020 | Orbigo et al. |
| 10,978,179 B2 | 4/2021 | Beltre et al. |
| 11,051,207 B2 | 6/2021 | Nieminen |
| 11,089,485 B2 | 8/2021 | Wainer et al. |
| 11,158,398 B2 | 10/2021 | Tong et al. |
| 11,223,960 B2 | 1/2022 | Orbigo et al. |
| 11,240,131 B2 | 2/2022 | Su et al. |
| 11,271,797 B2 | 3/2022 | Yadav et al. |
| 11,343,381 B2 | 5/2022 | Zhang et al. |
| 11,445,567 B2 | 9/2022 | Shih et al. |
| 11,470,490 B1 | 10/2022 | Tuli et al. |
| 11,510,106 B2 | 11/2022 | Zeng |
| 11,564,117 B2 | 1/2023 | Kerl et al. |
| 11,606,716 B2 | 3/2023 | Yoon |
| 11,622,287 B2 | 4/2023 | Wakim et al. |
| 11,641,597 B2 | 5/2023 | Bellamkonda et al. |
| 2011/0216732 A1 | 9/2011 | Maeda et al. |
| 2016/0328120 A1 | 11/2016 | Smith |
| 2021/0194771 A1* | 6/2021 | Sridhar .............. H04L 43/0841 |
| 2021/0201437 A1 | 7/2021 | Yerli et al. |
| 2022/0256358 A1 | 8/2022 | Tosyali et al. |
| 2023/0007500 A1 | 1/2023 | Gupta et al. |
| 2023/0044296 A1 | 2/2023 | Chu et al. |
| 2023/0075810 A1 | 3/2023 | Ho et al. |
| 2023/0189169 A1 | 6/2023 | Vivanco et al. |
| 2023/0194279 A1 | 6/2023 | Kakosyan et al. |
| 2023/0199511 A1 | 6/2023 | Singh et al. |
| 2023/0199514 A1 | 6/2023 | Singh et al. |
| 2023/0209367 A1 | 6/2023 | Chang et al. |
| 2023/0209370 A1 | 6/2023 | Pateromichelakis et al. |

FOREIGN PATENT DOCUMENTS

| | | |
|---|---|---|
| CN | 108990154 A | 12/2018 |
| CN | 110337081 B | 11/2020 |
| CN | 107920362 B | 12/2020 |
| CN | 112116160 A | 12/2020 |
| CN | 112514455 A | 3/2021 |
| CN | 112534963 A | 3/2021 |
| CN | 112996067 A | 6/2021 |
| CN | 113498137 A | 10/2021 |
| CN | 113891406 A | 1/2022 |
| CN | 114881541 B | 11/2022 |
| CN | 113938954 B | 6/2023 |
| CN | 113950080 B | 6/2023 |
| DE | 202006020967 U1 | 4/2011 |
| DE | 112013000681 B4 | 8/2020 |
| EP | 3349500 A1 | 7/2018 |
| EP | 3785140 A1 | 3/2021 |
| EP | 3269164 B1 | 6/2023 |
| WO | 2013075330 A1 | 5/2013 |
| WO | 2016055980 A1 | 4/2016 |
| WO | 2016075693 A1 | 5/2016 |
| WO | 2020178811 A1 | 9/2020 |
| WO | 2021012835 A1 | 1/2021 |
| WO | 2021139881 A1 | 7/2021 |
| WO | 2021188763 A1 | 9/2021 |
| WO | 2021224705 A1 | 11/2021 |

* cited by examiner

RESOURCE REALLOCATION IN TELECOMMUNICATIONS NETWORKS USING NETWORK PERFORMANCE MODELS

BACKGROUND

A telecommunications network is a group of nodes interconnected by telecommunications links that are used to exchange messages between the nodes. The links may use a variety of technologies based on the methodologies of circuit switching, message switching, or packet switching to pass messages and signals. Multiple nodes may cooperate to pass the message from an originating node to the destination node, via multiple network hops. For this routing function, each node in the network is assigned a network address for identification and for locating the node on the network. The collection of addresses in the network is called the address space of the network. Examples of telecommunications networks include computer networks, the internet, the public switched telephone network (PSTN), the global Telex network, the aeronautical ACARS network, and the wireless radio networks of cell phone telecommunications providers.

BRIEF DESCRIPTION OF THE DRAWINGS

Detailed descriptions of implementations of the present technologies will be described and explained through the use of the accompanying drawings.

Figure 1:
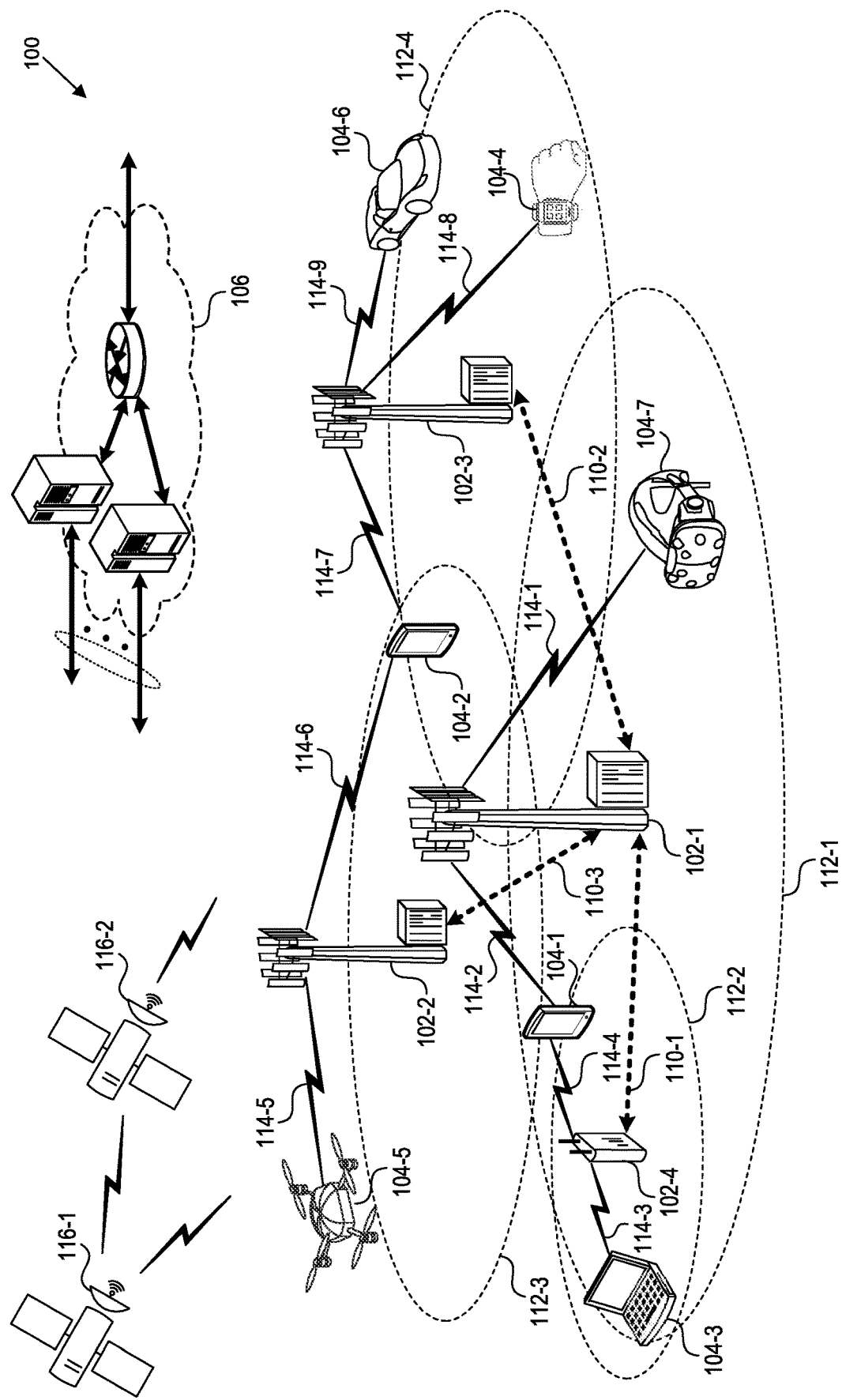
FIG. 1 is a block diagram that illustrates a wireless communications system that can implement aspects of the present technology.

The technologies described herein will become more apparent to those skilled in the art by studying the Detailed Description in conjunction with the drawings. Embodiments or implementations describing aspects of the technologies are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to resource reallocation in a telecommunications network by using network performance models. The solution provides quantifiable methods and systems for creating a score that is reflective of the "experience" of telecommunications network subscribers in an area of the network and also provides recommendations based on such scores, as well as standardized methods for evaluating decisions resulting from such recommendations. In some examples, areas are associated with cell sites of the telecommunications network.

The score is a composite metric that includes telecommunications resources affecting a user's experience, i.e., "user experience resources," as well as the features of a cell site that influence those user experience resources. These influential features are referred to as "cell site parameters" (power to a cell tower, the angle or tilt of a cell antenna, etc.). User experience resources include a total number of user connections in a cell area, an average speed among user connections in the cell area, and an average payload supported by the cell area for the user connections. The network performance models are influenced by weights configured to reflect a bias toward one or more user experience resources, at the expense of other user experience resources, given a set of conditions in the area and an engineer's preference. In some embodiments, the score is composed according to telecommunications domain experts' knowledge of relationships between cell site parameters and their corresponding effects on user experience resources. In some embodiments, these relationships are estimated probabilistically from logged telecommunications data including performance results in an area subsequent to resource allocation decisions.

In example embodiments, network performance models include regressions, statistical distributions, and machine learning models configured to assign scores to areas within a region of the telecommunications network. Regressions include linear regressions, logistic regressions, support vector machines, and other methods for delineating datapoints. For example, machine learning models include decision trees, random forests, Gaussian Mixture Models, expectation maximization systems, Multilayer Perceptrons, Transformers, Adversarial Neural Networks, Convolutional Neural Networks, Long Short-Term Memories (LSTMs), and other models with varying combinations of layers, designs, and loss functions.

The scores assigned by the network performance models are the basis for resource allocation recommendations and decisions within the region. One example of a resource allocation recommendation or decision is a reallocation of user experience resources from an area with a high score to an area with a low score. Other methods rely solely on the experience or preferences of engineers or domain experts to make resource allocation or load balancing recommendations and decisions within a telecommunications network. Such methods encounter problems in applying heuristics that are sometimes inconsistent and difficult to verify, particularly when the problem space is as multivariate and complex as that of an entire telecommunications network, where subscriber demand can vary according to conditions that are difficult to predict without computer assistance. The methods and systems disclosed herein solve these problems by relying on probability and big data, which can be tracked, measured, and evaluated more easily than personal preference or professional intuition.

The description and associated drawings are illustrative examples and are not to be construed as limiting. This disclosure provides certain details for a thorough understanding and enabling description of these examples. One skilled in the relevant technology will understand, however, that the technologies can be practiced without many of these details. Likewise, one skilled in the relevant technology will understand that the technologies can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC)).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Resource Reallocation Using Network Performance Models

Figure 2:
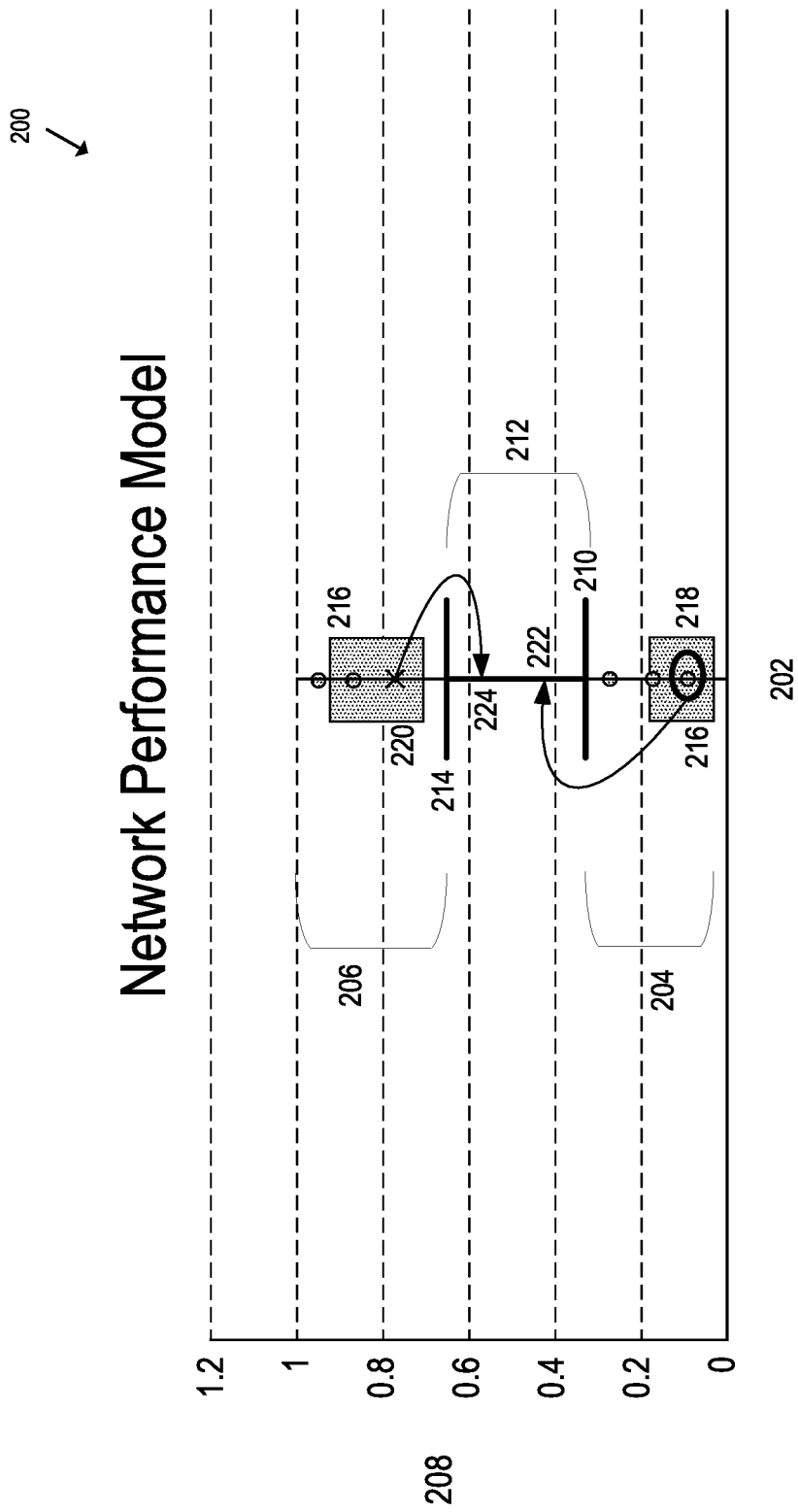
FIG. 2 is a graph that illustrates the results of a network performance model that can implement aspects of the present technology.

FIG. 2 is a graph that illustrates the results of a network performance model 200 that can implement aspects of the present technology. In some embodiments, the network performance model 200 is a performance model. The network performance model 200 can be included in a system of a telecommunications network that includes one or more hardware processors and at least one non-transitory memory. In another embodiment, the network performance model 200 includes operations that are stored as instructions on a non-transitory, computer-readable storage medium. These instructions can be executed by at least one data processor or hardware processor of the system, and can cause the system to perform the operations.

The operations include detecting network performance in a region of the telecommunications network. The region includes a set of cell areas 202 that support subscribers of the telecommunications network. Cell areas can include cells, macro cells, micro cells, pico cells, or femto cells. The telecommunications network can include 3G, 4G, 5G, 6G, NTN, LAN, or WAN. The region can be delineated according to geography, topography, network performance, subscriber density, or some combination of these factors. In some embodiments, the system detects network performance by receiving an alert.

The operations include determining low-performing cell areas 204 and high-performing cell areas 206 from the set of cell areas 202. This determination is accomplished using the network performance model 200, which assigns performance scores 208 to cell areas 202 based on user experience resources and/or cell site parameters belonging to the cell areas 202. In some embodiments, user experience resources are user resources, and cell site parameters are cell parameters. The network performance model 200 can determine one or more low-performing cell areas 204 and/or high-performing cell areas 206.

User experience resources can include a total number of user connections in a cell area, an average speed among user connections in a cell area, or an average payload supported by a cell area for user connections in the cell area. Cell parameters can include power to an antenna, antenna tilt, and antenna beam shape. In those embodiments in which the system detects network performance by receiving an alert, the alert can be triggered by user experience resources crossing a performance threshold in one or more cell areas.

In some embodiments, the network performance model 200 includes a set of weights based on a desired performance metric. The desired performance metric biases user experience resources in favor of one or more preferred resources over one or more unpreferred resources. In an example embodiment, the desired performance metric accomplishes this by assigning greater weights to the preferred resources in the network performance model 200. In some embodiments, the desired performance metric is determined by the system before the network performance model 200 is used to determine low-performing cell areas 204 and high-performing cell areas 206. This determination of the desired performance metric can be based on an input provided to a user device that is connected to—or a part of—the system. The input can be received from an entity, or based on a measure of the user resources of a cell area over a time period.

For example, in a cell area that is experiencing an unusually high number of user connections, a network engineer (or other domain expert) determines the desired performance metric by assigning the total number of user connections to the set of preferred resources, at the expense of average connection speed, which is assigned to the set of unpreferred resources. Alternatively, through statistical process control, the network performance model 200 determines a significant increase in the total number of user connections for a cell area, judging significance as a distance from an average or norm (e.g., established from historical data). As a response to the significant increase, the network performance model 200 determines the desired performance metric automatically by assigning the total number of user connections to the set of preferred resources.

Low-performing cell areas 204 include performance scores 208 that are less than a lower bound 210 of an acceptable range 212, while high-performing cell areas 206 include performance scores 208 that are higher than an upper bound 214 of the acceptable range 212. The lower bound 210 can be a first bound, the upper bound 214 can be a second bound, and the acceptable range 212 can be a range.

The operations include determining common subscribers 216 who subscribe to both low-performing cell areas 204 and high-performing cell areas 206. A common subscriber can subscribe to one or more low-performing cell areas and to one or more high-performing cell areas. In some embodiments, common subscribers 216 are ranked based on the number of times they have attempted to connect to the low-performing cell areas 204 and to the high-performing cell areas 206 over a time period. Attempts to connect can be unsuccessful, successful, or aborted, and can include Wi-Fi connections and/or data connections in support of voice calls, video calls, text messages, or the exchange of other media and data between devices (which can be accomplished over intermediary nodes belonging to the telecommunications network). The time period can be fixed or dynamic (e.g., a period of time that has already elapsed, or that is currently ongoing).

After ranking common subscribers 216 in such embodiments, the system identifies top subscribers. Top subscribers can be identified according to their position above a baseline. The baseline can be set based on the number of attempted connections made by the subscribers for the time period. In such embodiments, the subscribers who occupy top positions in both the high-performing cell areas 206 and the low-performing cell areas 204 determine a donor cell area 220 and a recipient cell area 218.

The operations include identifying a recipient cell area 218 from the low-performing cell areas 204 and a donor cell area 220 from the high-performing cell areas 206 based on the number of common subscribers 216. The recipient cell area 218 and the donor cell area 220 share a greater number of common subscribers 216 when compared to other potential pairings between low-performing cell areas 204 and high-performing cell areas 206.

The network performance model 200 assigns an increased performance score 222 to the recipient cell area 218 based on changes to the cell site parameters of the recipient cell area 218. The network performance model 200 also assigns a decreased performance score 224 to the donor cell area 220 based on changes to the cell site parameters of the recipient cell area 218. The increased performance score 222 and the decreased performance score 224 are both above the lower bound 210 of the acceptable range 212. Alternatively, the network performance model 200 can assign an equivalent performance score or a second improved performance score to the donor cell area 220. The changes to the cell site parameters cause a reallocation of user experience resources from the donor cell area 220 to the recipient cell area 218. This reallocation of donor user experience resources to become recipient user experience resources results in an improvement to the recipient cell area 218 without causing an impairment to the donor cell area 220. In some embodiments, the improvement is measurable by a first performance score 222 assigned to the recipient cell area 218. The first performance score 222 can be above a first bound 210 of a range 212. The impairment is measurable by a second performance score 224 assigned to the donor cell area 220. The second performance score 224 can be below a second bound 214 of the range 212 and above the first bound 210.

The network performance model 200 assigns an increased performance score 222 to the recipient cell area 218 based on the improvement to user experience resources. The performance score of a cell area is associated with the user experience of subscribers in that cell area. Operations performed by the system include generating an indication that the reallocation of donor user experience resources will improve a first user experience for a first group of subscribers of the recipient cell area 218, without impairing a second user experience for a second group of subscribers of the donor cell area 220.

In some embodiments, the operations include presenting the indication as a recommendation at a user device (e.g., a laptop, desktop, tablet, smart watch, or mobile phone). The recommendation is associated with a control configured to accept an input from a user (e.g., a network engineer or other telecommunications domain expert) of the user device. The input determines a decision to accept, refute, or revise the reallocation determined by the network performance model 200.

In some embodiments, the increased performance score is a predicted improvement, and the decreased performance score is a predicted decrease. In such embodiments, the operations include causing the reallocation of user experience resources from the donor cell area to the recipient cell area. Additionally, the network performance model 200 determines an actual improved performance score and an actual decreased performance score for the recipient cell area 218 and the donor cell area 220, respectively.

In some embodiments, the operations include determining an evaluation of the network performance model 200. The evaluation can be based on a first comparison of the predicted improvement with the actual improved performance score, as well as a second comparison of the predicted decrease with the actual decreased performance score. The evaluation can include accuracy, f1, recall, precision, and/or the AUC-ROC curve. Based on the evaluation, the system can revise the network performance model 200 to account for the actual improved performance score and for the actual decreased performance score. In one example, revising the network performance model 200 includes altering the weights associated with user experience resources as well as cell site parameters until the predicted scores match the actual scores, or fall within an acceptable margin of error.

Figure 3A:
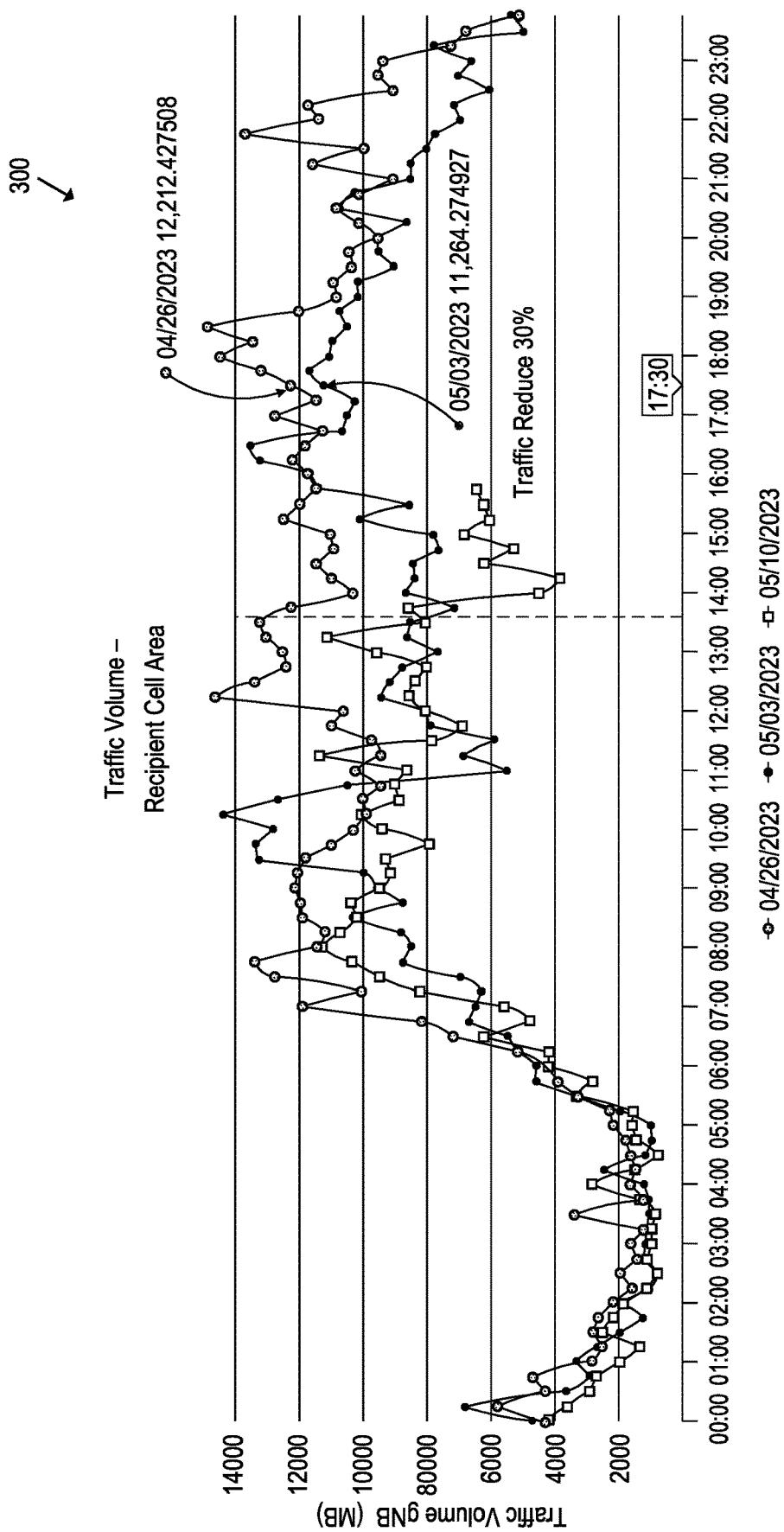
FIGS. 3A-3C are line charts that illustrate an example reallocation of user experience resources from a donor cell area to a recipient cell area.
Figure 3B:
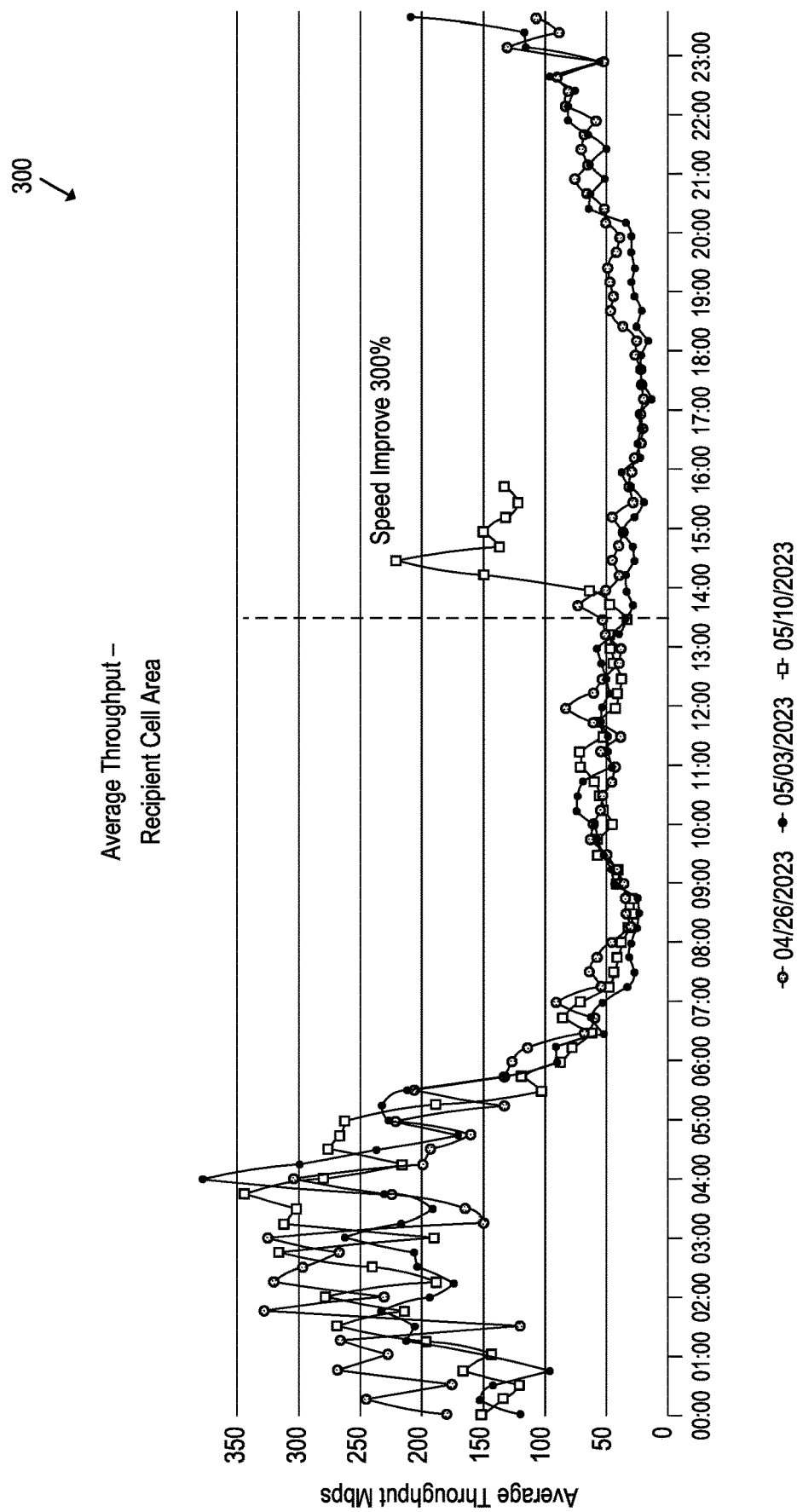
Figure 3C:
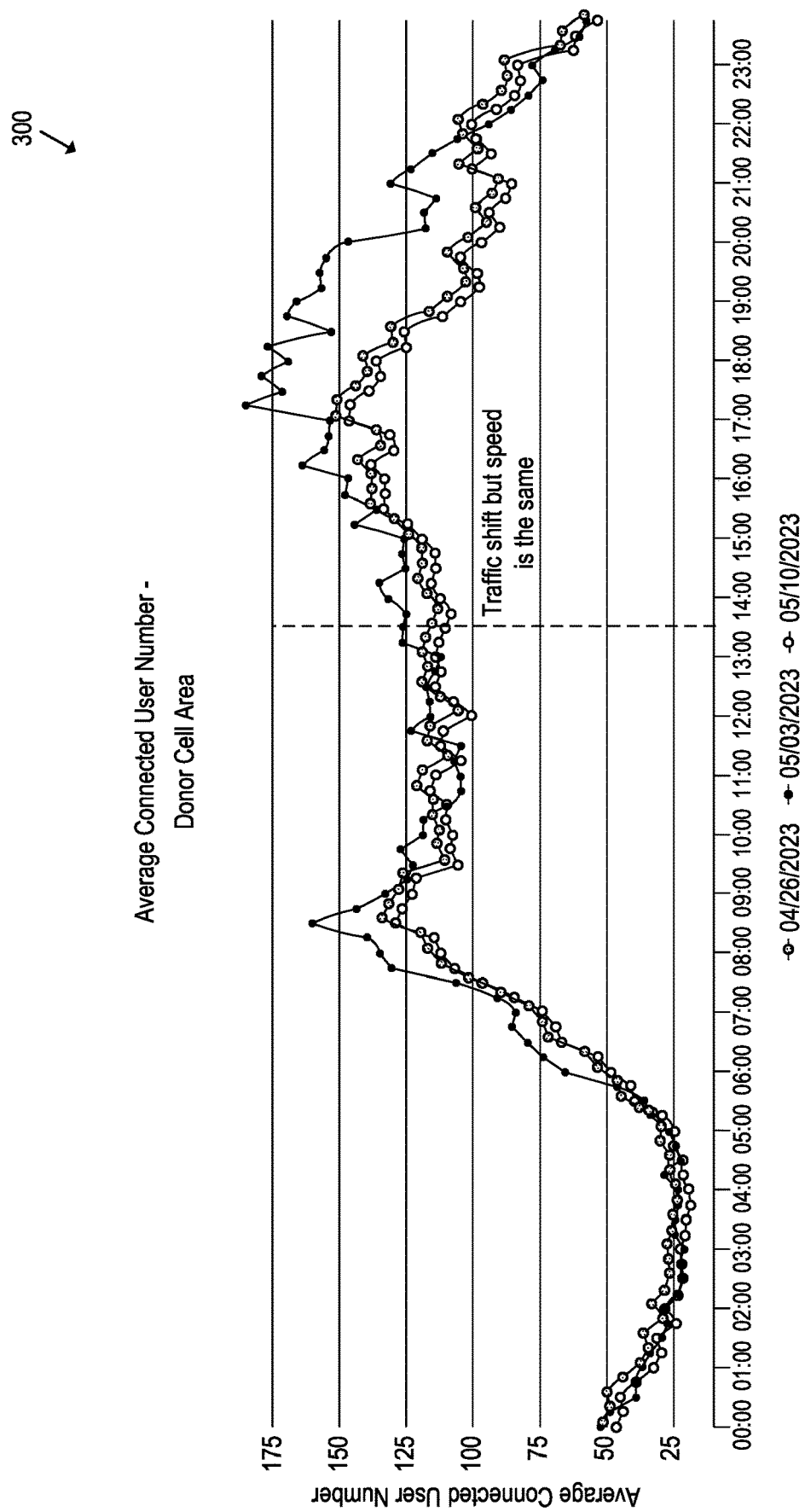

FIGS. 3A-3C are line charts that illustrate an example reallocation 300 of user experience resources from a donor cell area to a recipient cell area. In the example, the network performance model changes the cell site parameters of the recipient cell area by changing a tilt of the antenna belonging to the recipient cell area. Additionally, the network performance model changes the cell site parameters of the donor cell area by adjusting the power to an antenna belonging to the donor cell area. These changes cause a drop in the total number of subscribers supported by the recipient cell area. FIG. 3A illustrates this 30% drop in traffic in the recipient cell area between 13:00 and 14:00 on May 10, 2023, when the cell site parameters were changed. Continuing with this example, these changes also cause an increase in the average speed of the connections of the remaining users. FIG. 3B illustrates this 300% gain in average speed (i.e., "throughput") in the recipient cell area for the remaining subscribers, resulting from the change to the cell site parameters between 13:00 and 14:00 on May 10, 2023. By adjusting the power to the antenna belonging to the donor cell area, and changing the tilt of the antenna belonging to the recipient cell area, the network performance model shifts traffic from the recipient cell area to the donor cell area. FIG. 3C illustrates the shift in traffic to the donor cell area, without any subsequent negative impact on the average speed of the subscriber connections in the donor cell area.

Figure 4:
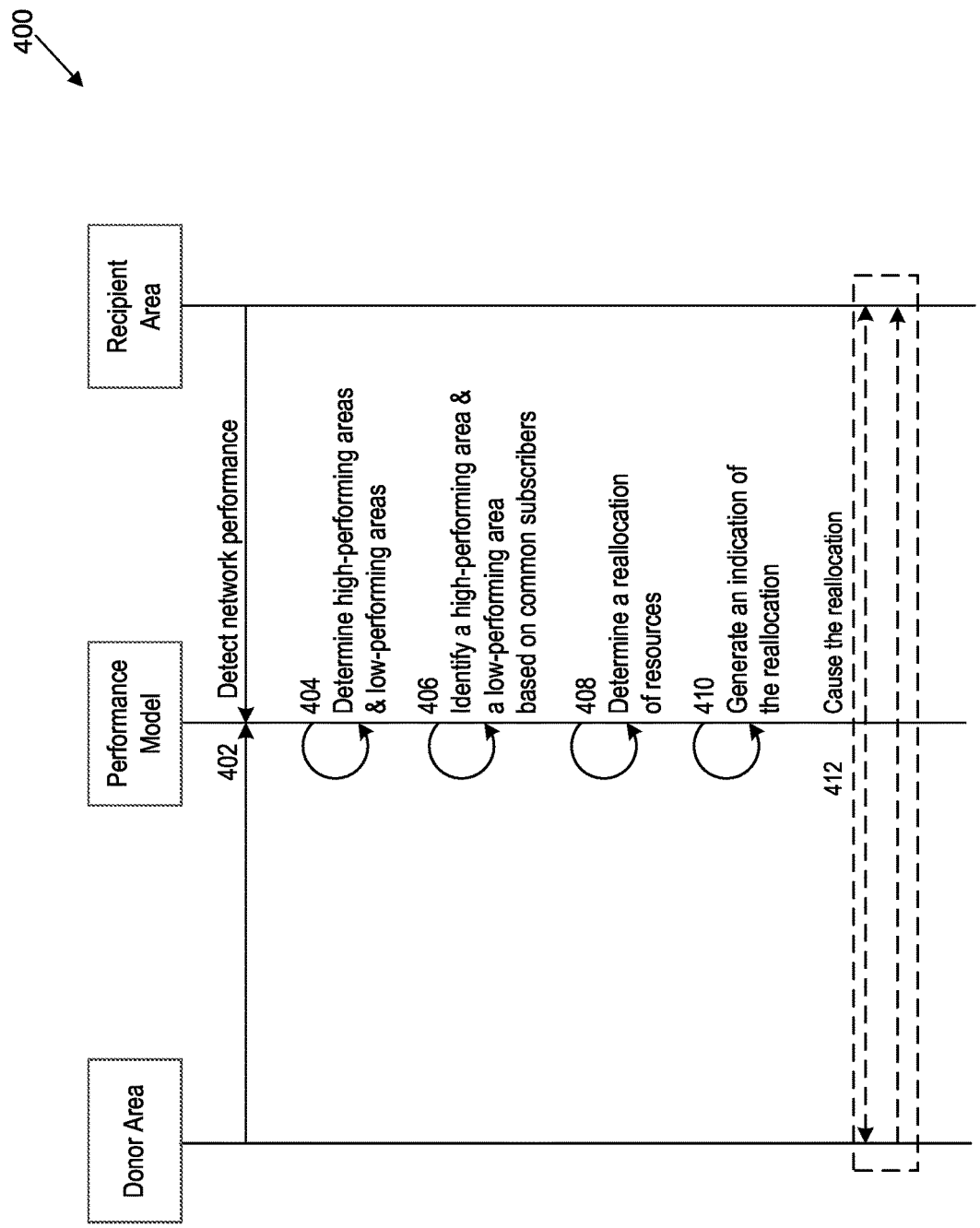
FIG. 4 is a flowchart that illustrates a method to improve user experience resources of a recipient cell area without impairing user experience resources of a donor cell area.

FIG. 4 is a flowchart that illustrates a method to improve user experience resources of a recipient cell area without impairing user experience resources of a donor cell area. The method includes a performance model 400 detecting performance in a set of areas of a telecommunications network, including a potential recipient area and a donor area (step 402). The method further includes determining low-performing areas and high-performing areas from the set of areas, using a performance model to assign scores to the set of areas based on the resources and parameters that belong to the set of areas (step 404). The low-performing areas include low scores that are below a first bound of a range, and the high-performing areas include high scores that are above a second bound of a range. The method further includes identifying a low-performing area and a high-performing area from the low-performing areas and the high-performing areas, based on common subscribers (step 406). Common subscribers subscribe to both the low-performing area and the high-performing area.

Determining common subscribers can include ranking subscribers for the low-performing areas and for the high-performing areas based on a number of attempted connections made by the subscribers over a time period. In such embodiments, step 406 can include identifying top subscribers from subscribers who occupy top positions in both the high-performing areas and the low-performing areas. That is, top positions are positions above a baseline number of attempted connections, or above a baseline position. Continuing with these embodiments, step 406 can also include determining the common subscribers based on the top subscribers.

The method further includes determining a reallocation of resources from the high-performing area to the low-performing area (step 408). This reallocation is determined by the model to cause an improvement to the low-performing area without impairing the high-performing area. The method further includes generating an indication that the reallocation will improve the user experiences of network subscribers in the low-performing area, without diminishing the user experiences of network subscribers in the high-performing area (step 410). In some embodiments, the method can also include causing the reallocation of user experience resources from the donor area to the recipient area (step 412).

Computer System

Figure 5:
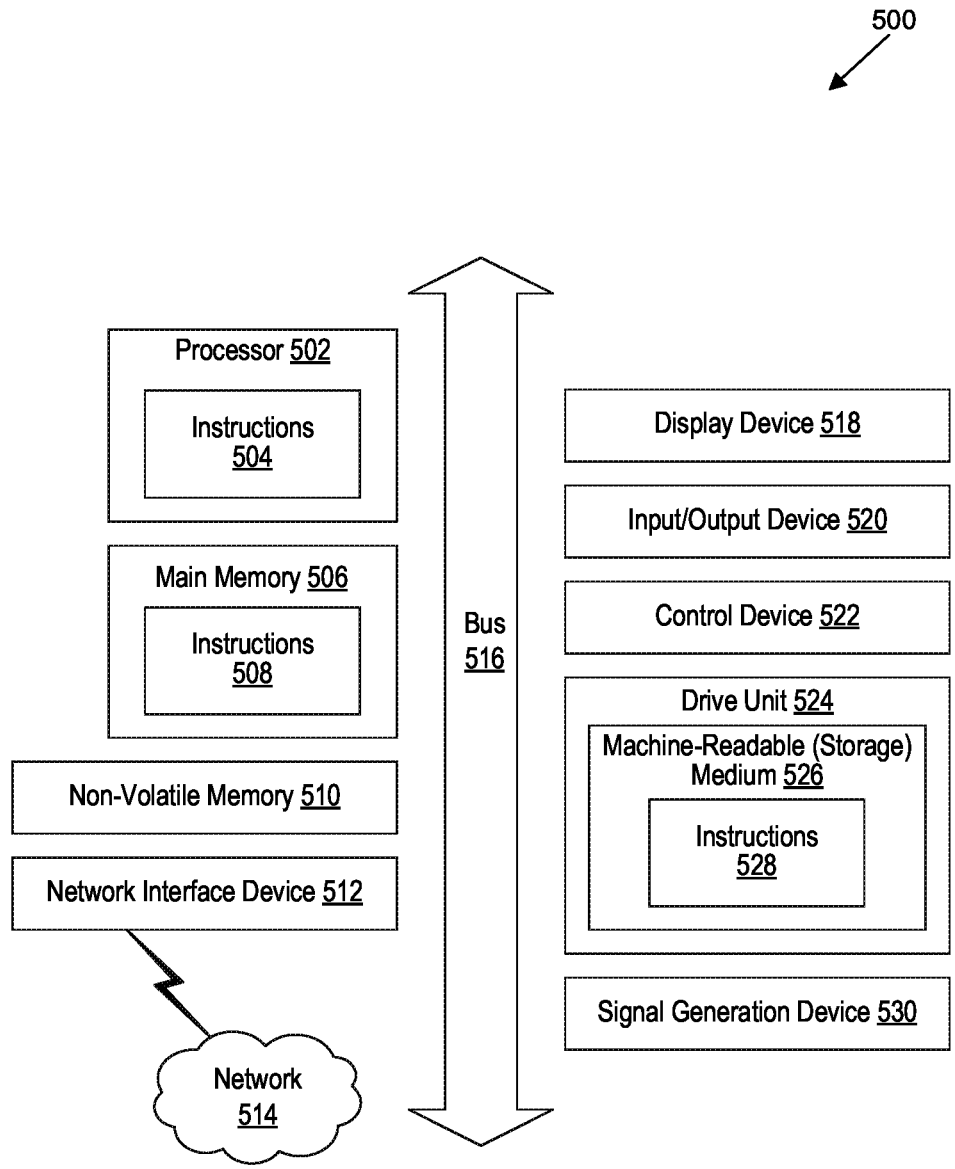
FIG. 5 is a block diagram that illustrates the components of a computing device.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the technologies. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the technologies, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the technologies should not be taken to imply that the terminology is being redefined herein to be restricted to any specific characteristics, features, or aspects of the technologies with which that terminology is associated. In general, the terms used in the following claims should not be construed to limit the technologies to the specific examples disclosed herein, unless the above Detailed Description explicitly defines such terms. Accordingly, the actual scope of the technologies encompasses not only the disclosed examples but also all equivalent ways of practicing or implementing the technologies under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the technologies can be modified to employ the systems, functions, and concepts of the various references described above to provide yet further implementations of the technologies.

To reduce the number of claims, certain implementations are presented below in certain claim forms, but the applicant contemplates various aspects of the technologies in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium storing instructions recorded thereon that, when executed by at least one data processor of a system of a telecommunications network, cause the system to:
    detect network performance in a region of the telecommunications network,
        wherein the region includes a set of cell areas that support subscribers of the telecommunications network;
    determine one or more low-performing cell areas and one or more high-performing cell areas of the set of cell areas by using a network performance model,
        wherein the network performance model assigns performance scores to cell areas based on user experience resources,
        wherein the one or more low-performing cell areas comprise performance scores that are less than a lower bound of an acceptable range, and wherein the one or more high-performing cell areas comprise performance scores that are higher than an upper bound of the acceptable range;
determine common subscribers between the one or more low-performing cell areas and the one or more high-performing cell areas,
wherein the common subscribers subscribe to both a low-performing cell area of the one or more low-performing cell areas and a high-performing cell area of the one or more high-performing cell areas;
identify a recipient cell area of the one or more low-performing cell areas and a donor cell area of the one or more high-performing cell areas based on a number of common subscribers between the recipient cell area and the donor cell area,
wherein the number of common subscribers between the recipient cell area and the donor cell area is greater than numbers of common subscribers of other cell area pairings between the one or more low-performing cell areas and the one or more high-performing cell areas;
determine a reallocation of donor user experience resources of the donor cell area to the recipient cell area by using the network performance model to assign an increased performance score to the recipient cell area and a decreased performance score to the donor cell area based on changes to one or more cell site parameters of the donor cell area and to one or more cell site parameters of the recipient cell area,
wherein the increased performance score and the decreased performance score are both above the lower bound of the acceptable range; and
generate an indication that the reallocation of the donor user experience resources will improve a first user experience for a first group of subscribers of the recipient cell area without impairing a second user experience for a second group of subscribers of the donor cell area.

2. The non-transitory, computer-readable storage medium of claim 1, wherein the user experience resources comprise at least one of:
a total number of user connections in a cell area;
an average speed among user connections in the cell area; or
an average payload supported by the cell area for the user connections.

3. The non-transitory, computer-readable storage medium of claim 1, wherein the one or more cell site parameters comprise at least one of:
power to an antenna;
parameter used to move subscribers between the one or more low-performing cell areas and the one or more high-performing cell areas;
parameter to define user preference toward specific cell area; or
a tilt of the antenna.

4. The non-transitory, computer-readable storage medium of claim 1, further causing the system to:
present the indication as a recommendation at a user device,
wherein the recommendation is associated with a control configured to accept an input from a user of the user device to accept, refute, or revise the reallocation.

5. The non-transitory, computer-readable storage medium of claim 1, wherein the increased performance score is a predicted improvement, wherein the decreased performance score is a predicted decrease, and wherein the system is further caused to:
cause the reallocation of the user experience resources of the donor cell area to the recipient cell area; and
determine an actual improved performance score assigned to the recipient cell area and an actual decreased performance score assigned to the donor cell area using the network performance model.

6. The non-transitory, computer-readable storage medium of claim 5, further causing the system to:
determine an evaluation of the network performance model based on a first comparison of the predicted improvement and the actual improved performance score, and based on a second comparison of the predicted decrease and the actual decreased performance score; and
based on the evaluation, revise the network performance model to account for the actual improved performance score and for the actual decreased performance score.

7. The non-transitory, computer-readable storage medium of claim 1, wherein determining the common subscribers further causes the system to:
rank subscribers for the one or more low-performing cell areas and for the one or more high-performing cell areas based on a number of attempted connections made by the subscribers over a time period;
identify top subscribers who occupy top positions in both the one or more high-performing cell areas and the one or more low-performing cell areas,
wherein the top positions are positions above a baseline number of attempted connections, or above a baseline position; and
determine the common subscribers based on the top subscribers.

8. The non-transitory, computer-readable storage medium of claim 1, wherein the network performance model comprises a set of weights based on a desired performance metric, wherein the desired performance metric biases the user experience resources in favor of one or more preferred resources over one or more unpreferred resources, and wherein prior to using the network performance model to determine low-performing cell areas and high-performing cell areas, the system is caused to determine the desired performance metric.

9. The non-transitory, computer-readable storage medium of claim 8, wherein determining the desired performance metric is based on an input to a user device received from a user, or on the user experience resources of a cell area over a time period.

10. The non-transitory, computer-readable storage medium of claim 1, wherein the system detects the network performance in the region by receiving an alert, and wherein the alert is triggered by the user experience resources of the set of cell areas of the region crossing a performance threshold.

11. A system comprising:
at least one hardware processor; and
at least one non-transitory memory storing instructions that, when executed by the at least one hardware processor, cause the system to:
detect network performance in a set of cells of a telecommunications network;
determine low-performing cells and high-performing cells of the set of cells by using a performance model to assign performance scores to the set of cells based on user resources and cell parameters of the set of cells,
    wherein low performance scores of the low-performing cells are below a first bound of a range,
    and wherein high-performance scores of the high-performing cells are above a second bound of the range;
determine common subscribers between the low-performing cells and the high-performing cells,
    wherein the common subscribers subscribe to both the low-performing cells and the high-performing cells;
identify a recipient cell of the low-performing cells and a donor cell of the high-performing cells based on a number of common subscribers shared by the recipient cell and the donor cell,
    wherein the number of common subscribers is greater than numbers of common subscribers shared by other cells of the low-performing cells and the high-performing cells;
determine a reallocation of donor user resources of the donor cell to the recipient cell to cause an improvement to the recipient cell without causing an impairment to the donor cell,
    wherein the improvement is measurable by a first performance score above the first bound of the range assigned to the recipient cell, and
    wherein the impairment is measurable by a second performance score above the first bound of the range assigned to the donor cell; and
generate an indication that the reallocation of the donor user resources will improve first user experiences of the recipient cell without diminishing second user experiences of the donor cell.

12. The system of claim 11, wherein the user resources of the set of cells comprise at least one of:
a total number of user connections in a cell area;
an average speed among user connections in the cell area; or
an average payload supported by the cell area for the user connections,
wherein the cell parameters comprise power to an antenna and a tilt of the antenna.

13. The system of claim 11, further caused to:
present the indication as a recommendation at a user device,
    wherein the recommendation is associated with a control that is configured to accept an input from a user of the user device to accept, refute, or revise the reallocation.

14. The system of claim 11, wherein the improvement is a predicted improvement, wherein the impairment is a predicted decrease, and wherein the system is further caused to:
cause the reallocation of donor user resources to the recipient cell;
determine an actual improved performance score assigned to the recipient cell and an actual decreased performance score assigned to the donor cell using the performance model;
determine an evaluation of the performance model based on a first comparison of the predicted improvement and the actual improved performance score, and based on a second comparison of the predicted decrease and the actual decreased performance score; and
based on the evaluation, revise the performance model to account for the actual improved performance score and for the actual decreased performance score.

15. The system of claim 11, wherein determining the common subscribers further causes the system to:
rank subscribers for the low-performing cells and for the high-performing cells based on a number of attempted connections made by the subscribers over a time period;
identify top subscribers from subscribers who occupy top positions in both the high-performing cells and the low-performing cells,
    wherein the top positions are positions above a baseline number of attempted connections, or above a baseline position; and
determine the common subscribers based on the top subscribers.

16. The system of claim 11:
wherein the performance model comprises a set of weights based on a desired performance metric,
wherein the desired performance metric biases the user resources in favor of one or more preferred resources over one or more unpreferred resources, and
wherein prior to using the performance model to determine low-performing cells and high-performing cells, the system is caused to:
determine the desired performance metric,
    wherein determining the desired performance metric is based on an input received from an entity or based on a measure of the user resources of a cell area over a time period.

17. The system of claim 11, wherein the system detects the network performance by receiving an alert triggered by user resources of the set of cells crossing a performance threshold.

18. A method comprising:
detecting network performance in a set of cell areas of a telecommunications network,
determining low-performing areas and high-performing areas of the set of cell areas by using a performance model to assign performance scores to the set of cell areas based on user experience resources and parameters of the set of cell areas,
    wherein the low-performing areas comprise low scores below a first bound of a range,
    wherein the high-performing areas comprise high scores above a second bound of a range;
determining common subscribers between the low-performing areas and the high-performing areas,
    wherein the common subscribers subscribe to both a low-performing area of the low-performing areas and a high-performing area of the high-performing cell areas;
identifying a recipient area of the low-performing area and a donor area of the high-performing area based on a number of common subscribers between the recipient area of the donor area,
    wherein the number of common subscribers between the recipient area and the donor area is greater than numbers of common subscribers of other area pairings between the low-performing areas and the high-performing areas;
determining a reallocation of resources from the donor area to recipient area by using the network performance model to assign an increased performance score to the recipient area and a decreased performance score to the donor area based on changes to one or more cell site parameters of the donor area and to one or more cell site parameters of the recipient area to cause an improvement to the low-performing area without impairing the high-performing area;

wherein the increased performance score and the decreased performance score are both above the first bound of the range; and generating an indication that the reallocation will improve user experiences of the recipient area without diminishing user experiences of the donor area.

19. The method of claim 18, wherein identifying a low-performing area and a high-performing area based on common subscribers comprises:

ranking subscribers for the low-performing areas and for the high-performing areas based on a number of attempted connections made by the subscribers over a time period;

identifying top subscribers from subscribers who occupy top positions in both the high-performing areas and the low-performing areas, wherein top positions are positions above a baseline number of attempted connections, or above a baseline position; and determining the common subscribers based on the top subscribers.

20. The method of claim 18:

wherein the performance model comprises a set of weights based on a desired performance metric, wherein the desired performance metric biases the resources in favor of one or more preferred resources over one or more unpreferred resources, and wherein prior to using the performance model to assign scores to the set of areas, the method further comprises:

determining the desired performance metric, and wherein determining the desired performance metric is based on an input received from an entity or based on a measure of the resources of a cell area over a time period.

* * * * *